Sheet 1-3 Sheets.

Sylla & Adams.

Harvester Dropper.

No. 2608

Reissued May 14, 1867.

Witnesses

Geo. E. Buckley

Inventor.

Phils Sylla
Augustus Adams
by their Atty
Geo. Harding

Sylla & Adams.

Harvester Dropper.

No. 2608 Reissued May 14, 1867.

Witnesses.

Wm. L. Buckley

Geo. E. Buckley

Inventor.

Philo Sylla

Augustus Adams by their Atty

Geo. Harding

Sylla & Adams.

Harvester Dropper.

No. 2608 Reissued May 14, 1867.

Witnesses.

Benj. F. Woolley

Geo. E. Buckley

Inventor.

Mich. Sylla

Augustus Adams by their attorney

J. Wooding

UNITED STATES PATENT OFFICE.

PHILO SYLLA, OF ELGIN, AND AUGUSTUS ADAMS, OF SANDWICH, ILLINOIS, ASSIGNEES, BY MESNE ASSIGNMENTS, OF THEMSELVES.

IMPROVEMENT IN HARVESTERS.

Specification forming part of Letters Patent No. 10,038, dated September 20, 1853; reissue No. 722, dated May 17, 1859; reissue No. 2,608, dated May 14, 1867.

*To all whom it may concern:*

Be it known that PHILO SYLLA, of Elgin, in the county of Kane and State of Illinois, and AUGUSTUS ADAMS, formerly of the same place, but now residing at Sandwich, in the county of De Kalb, in said State, invented certain new and useful Improvements in Machines for Harvesting Grain, Mowing Grass, &c., of which the following is a full, clear, and exact description, reference being had to the annexed drawings, which make part of this specification, and in which—

Figure 1:
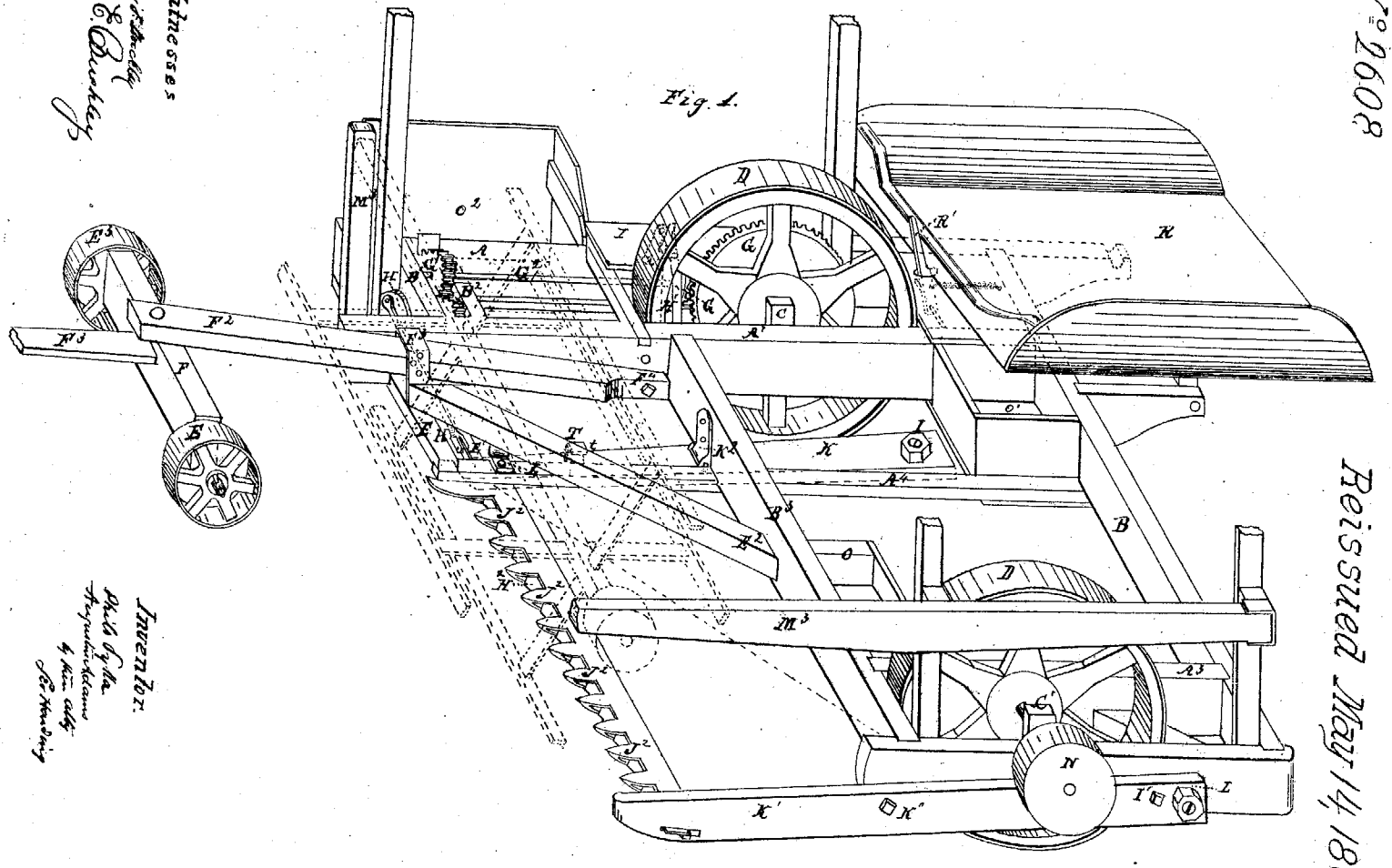
Figure 2:
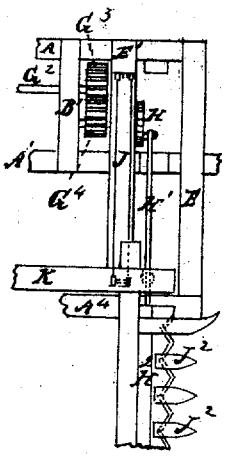
Figure 4:
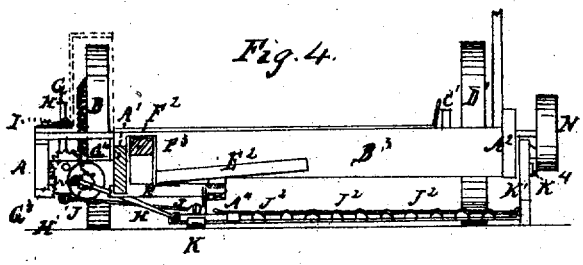
Figure 6:
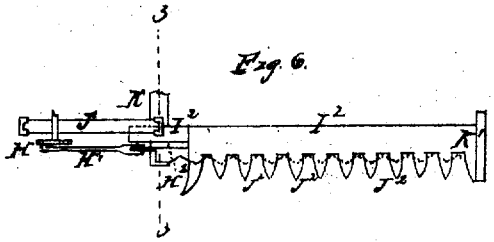
Figure 3:
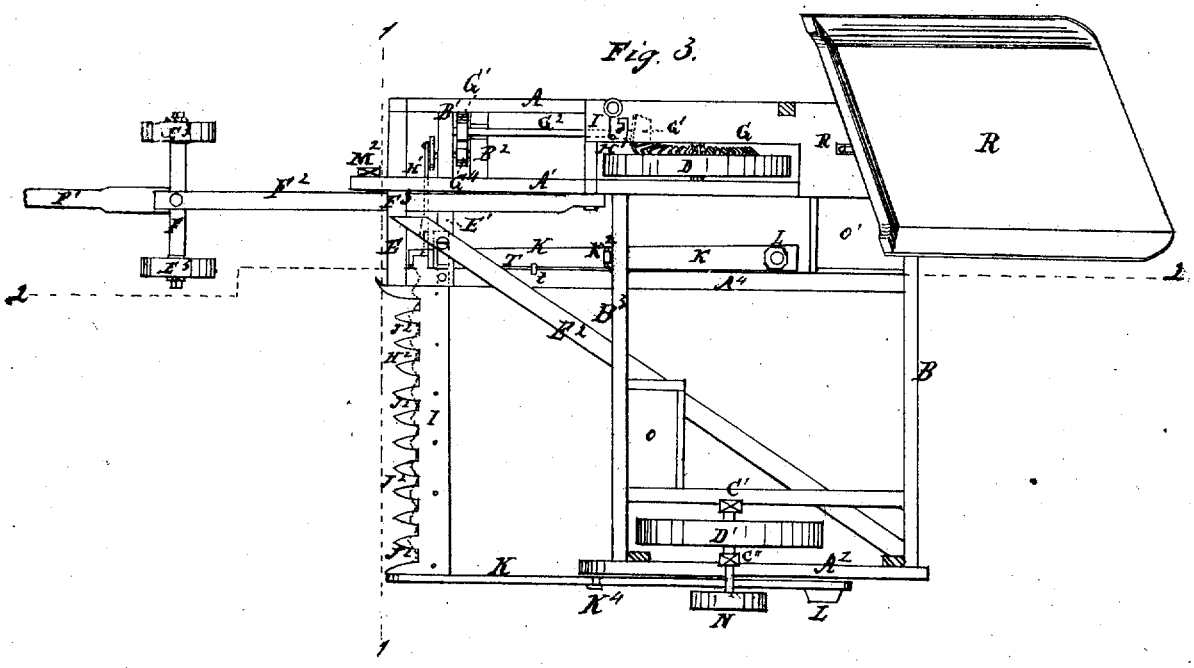
Figure 5:
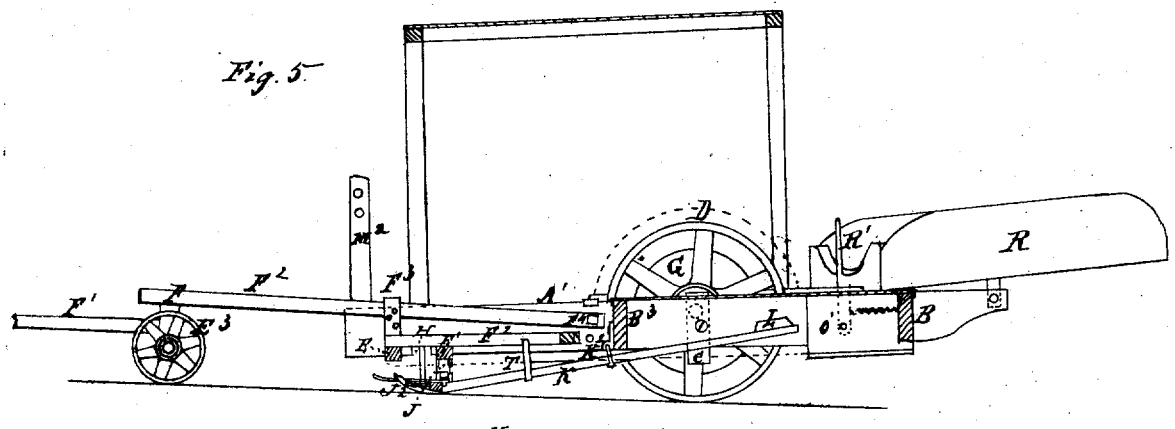
Figure 7:
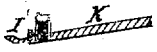

Figure 1 is a view, in perspective, of a machine, showing one mode of applying said improvements, the finger-beam being raised from the ground to adapt the machine for reaping. Fig. 2 represents a plan of a portion of the under side of the machine, to exhibit more fully the flexible connection of the finger-beam with the main frame. Fig. 3 represents a plan of the machine, the finger-beam resting on the ground to adapt the machine for mowing. Fig. 4 represents a vertical transverse section of the machine at the line 1 1 of Fig. 3. Fig. 5 represents a vertical longitudinal section of the same at the line 2 2 of Fig. 3. Fig. 6 represents a plan of the cutting apparatus, the finger-beam, and the coupling-arm for connecting the finger-beam to the main frame. Fig. 7 is a vertical section at the line 3 3 of Fig. 6, showing the provision for allowing play in the joint between the finger-beam $I^2$ and the yielding bar K.

That side of the machine which runs next the standing grain we call the left side, and the other, at which the horses are placed, we call the right side.

The accompanying drawings represent a machine having a frame large enough to support, in addition to the cutting apparatus and machinery required for mowing, a removable platform placed behind the cutter, (such as is common in ordinary machines adapted to reaping and mowing;) an elevated table behind the platform, to bind the grain upon; stands for a raker and binders; a dumping-tray, to carry the sheaves until a sufficient quantity for a shock has accumulated, and then to dump them in a heap upon the ground; and stand or place for the driver of the team by which the machine is drawn.

Whenever it may be expedient to use one or more of the several parts or branches of said improvements separate from the rest, such part or parts might be used in connection with frames and gearing more conveniently than those herein described, which are proportioned and arranged with reference to the use of the whole of the parts together; and it is obvious that several parts of the said improvements are applicable to various other reaping and mowing machines now in use. One mode of applying each of these improvements to practical use is shown in this machine. It is, therefore, unnecessary to specify the manner of applying the parts respectively to other machines, as the ordinary skill of a constructer is sufficient for that purpose.

Machines for reaping and mowing, as heretofore constructed, have not carried their cutting apparatus in a way that left it free enough to conform to the surface of uneven ground, to mow grass with sufficient evenness on such ground.

To remedy this defect is the object of that branch of said improvements which is the subject of this patent, and which consists in connecting the beam that carries the cutting apparatus with the main frame by means of intermediate yielding arms or bars, in such manner that either end of the beam may rise and fall within certain limits without elevating or depressing the other end, and that, while being drawn over undulating ground, the upward and downward movements of the beam shall be independent of such movements of the frame and governed by the undulations of the ground.

In the accompanying drawings, the main frame A $A^1$ $A^2$ $A^3$ $A^4$ B $B^1$ $B^2$ $B^3$ E $E^1$ $E^2$ is supported upon two wheels, D and $D^1$, whose journals rest in bearings in blocks C $C^1$, made adjustable to set the frame at a variable distance from the ground. This frame is heavier in front of than behind the axis of the wheels D and $D^1$, and the preponderating weight is sustained by a truck in front composed of two wheels, $E^3$ $E^3$, and an axle, F, and connected with the frame by a draft-bar, $F^2$, hinged at its rear end on a pivot, $F^4$, to the beam $A^1$ of the frame. For the purpose of allowing the front of the main frame to be raised, lowered, and held at different heights, the draft-bar passes through a strap, $F^3$, attached to the beams E and $A^1$, and a wedge placed between the top of the strap and the draft-bar holds the front of the frame at any required height within the range of adjustment allowed by the strap, and it may be lowered by withdrawing the wedge, and may be held down by placing the wedge between the under side of the draft-bar and the bottom of the strap. A like effect may be produced by passing a pin through the strap above or below the draft-bar, in the holes made for the pin in the sides of the strap. By these means the connection of the draft-bar with the frame may, by turns, be limber or rigid, and the front of the frame set at various heights from the ground. When the wedge and pin are withdrawn the front of the main frame and the front end of the tongue, respectively, are free to play up and down within the limits of the strap independently of each other. The ends attained by the adjustment already described may likewise be attained, to a certain extent, by adjusting the pivot $F^4$, on which the rear end of the draft-bar $F^2$ hinges, from one hole to another in a series formed for its reception in the side of the beam $A^1$. The tongue $F^1$, by which the horses draw the machine, is attached to and extends forward from the axle of the truck. The motion of the cutter in this machine is derived from one of the wheels which carry the main frame. On the side of the right wheel D a bevel-wheel, G, is secured, which takes into and drives a pinion, $G^1$, and counter-shaft, $G^2$, which also carries a spur-wheel, $G^3$, that takes into and drives a pinion, $G^4$, on the end of a shaft, whose opposite end carries a crank, H, which, through a connecting-rod, $H^1$, jointed to the cutter-bar $H^2$, communicates a vibratory motion to a cutter arranged to play through a series of guard-fingers, $J^2$, projecting from the front side of the finger-beam $I^2$. The bearing of that end of the shaft $G^2$ which carries a pinion, G, is in an upright arm, $H^3$, hinged at its lower end to the frame, so that by turning this arm toward or from the wheel D the pinion may be thrown into or out of gear with the wheel to put the cutter into or out of motion. The pinion is held in either position at will by means of a notched detent, I, pivoted to the main frame. The cutter $H^2$ is a vibrating scalloped cutter, and guard-fingers $J^2$ are slotted and of the usual construction, and supported by the finger-beam in the usual manner. The right end of the finger-beam $I^2$ is connected to the frame by means of a strong link or coupling-arm, J, hinged at its left end to the right end of the finger-beam, and at its right end to a cross-beam, $E^1$, of the main frame.

The progressive motion of the frame on its wheels carries forward the coupling-arm, and that in its turn carries forward the finger-beam and cutter, and, as the coupling-arm is rigid laterally only, and its left end (to which the finger-beam is connected) free to rise and fall, the finger-beam necessarily rests on the surface of the ground; therefore, in passing over undulating ground, the finger-beam will rise and fall at either or both ends, and sway up and down, as may be required, to conform to the surface of the ground, and will have an upward and downward motion corresponding to the upward and downward inclinations of such surface. Moreover, the finger-beam thus arranged will move along the surface of uneven ground without being raised or lowered by the rising and falling and the swaying up and down of the main frame, or the rising and falling or swaying to the right and left of the driving-wheel. Thus the upward and downward movements of the finger-beam are rendered in a great measure, if not altogether, independent of those of the driving-wheel and main frame.

The said inventors also devised the plan of supporting the coupling by a yielding bar or brace, K, extending from the junction of the left end of the coupling-arm with the right end of the finger-beam backward, and connected by a hinge, $K^2$, to the cross-bar $B^3$ of the frame; and, in order that this brace may in no way, not even by its own weight, hinder the upward and downward movements of the finger-beam, its rear end is extended some distance behind its hinge $K^2$, and is enlarged to counterbalance by its own weight not only the weight of its front end, but also that of the coupling-arm and of the connecting-rod, which gives motion to the cutters, so that the right end of the finger-beam may bear as lightly on the ground and be as free to rise and fall as the left end. The bar K takes the transverse strain off the cutting-arm, and is subjected mainly to a thrusting strain, and the coupling-arm, thus relieved by the bar, is now subjected mainly to a tensile strain, and together they are capable of resisting all the strains that would be produced by drawing the finger-beam over the surface of the roughest ground suitable for mowing with a machine. Since, however, this machine is designed for reaping as well as mowing, and must, therefore, be capable of carrying a platform wherever it is required to be used as a reaper, and when so used it must likewise be capable of carrying the finger-beam at a height of several inches above the ground, the said inventors contrived a second yielding bar, $K^1$, to support the left end of the finger-beam, to which it is attached at its forward end, and is hinged to the side rail $A^2$ of the frame on a pivot, $K^4$. The forward ends of both the yielding bars are connected with the finger-beam, one of then, at least, not rigidly, but both strongly, so as to give the requisite support to the beam without preventing it from swaying freely within certain limits, or rising and falling at either end unrestrained by the opposite end. One mode of securing the requisite freedom of the connection is by providing for play in the joint between the bar K and the finger-beam, as shown in Fig. 7. The yielding bars extend under and a short distance in advance of the finger-beam, and are rounded and curved upward at the end, in the manner of sled-runners, to prevent them from penetrating the ground. The finger-beam being thus connected with the driving-wheel and with the frame for supporting the gearing, so as to leave it free to rise and fall at both ends, and at either end within certain limits without disturbing the level of the other, these movements are greatly facilitated and the adaptability of the finger-beam to the varying inclination of the surface of the ground greatly promoted, as the said inventors discovered, by making the finger-beam short, (as represented in the drawings,) *i. e.*, of only sufficient length to protect the cutting apparatus, and not long enough to extend beyond the cutter-bar across the gearing-frame, as is common when the finger-beam is rigidly connected to the frame. If the machine, with this short finger-beam thus arranged and supported, should be crossing a ditch with the finger-beam parallel, or but little inclined, to the same, from the readiness with which the beam conforms itself to the surface of the ground, it would, of course, drop bodily into the ditch, and the cutting apparatus, abutting against the bank, would cause a sudden shock that would strain if it did not break the machine. To prevent such difficulties, a stop is provided which operates to limit the descent of the right end of the finger-beam below the level of the track which the driving-wheel would make when crossing the ditch, but will not restrict its rising. In this instance, the stop is made in the form of a hook, T, and is attached rigidly in an upright position to the yielding bar K, so as to overhang one of the beams $A^4$ of the gearing-frame. The lip *t* of this hook is generally carried at some distance above the frame; but when the cutting apparatus is passing across a ditch or other like depression of the ground, then the lip of the hook rests upon the frame, suspending the right end of the finger-beam, with the coupling-arm J and bar K attached, and carrying them over the ditch. When the right end of the finger-beam is thus carried over a depression, the left end in general passes through without danger, rendering it inexpedient to arrange a stop at that end also.

In reaping it is necessary to carry the cutter and the finger-beam at some distance above the ground, and to cover the space immediately in rear of the finger-beam with a platform to receive the grain as it is cut, and carry it until a sufficient quantity to form a sheaf has accumulated, when it is raked off and may be deposited in gavels upon the ground to be there bound into sheaves, but it is preferable to deposit it on a table behind or at the side of the platform, and there bind it into sheaves, which may be dropped as fast as bound upon the ground; but it is preferable to deposit them in a dumping-tray until enough have been accumulated for a shock, when the tray is tripped and the sheaves dumped on the ground in a heap. To carry the finger-beam and cutter at the proper height, and to support the platform, the rear ends of the yielding bars K $K^1$ are depressed, that of $K^1$ being secured by a bolt, $L^1$, rigidly to the beam $A^2$ of the frame, and that of K being in like manner secured by a bolt, $L^2$, to the beam $A^4$, as represented in Fig. 1. Thus supported and arranged, the finger-bar performs its duty in the machine as a reaper in the same way as if it were in the usual manner made a fixed part of the main frame and incapable of running upon the ground. The platform covers the quadrangular space included between the bars K $K^1$, the finger-beam, and the beam $B^3$ of the frame. The machine may be fitted with a reel constructed in the usual manner, and supported on the right side of the machine by a post, $M^2$, and on the left side by a horizontal bearer, $M^3$, and this reel may be driven from a pulley, N, on the axle of the left driving-wheel. As the platform upon which the grain collects as it is cut, the table upon which it is bound into sheaves, and the tray for carrying the sheaves until a quantity suitable for a shock has accumulated, and then dumping them into a heap, form no part of the subject-matter of the claims under this patent, a further description of them is here deemed unnecessary.

What is claimed under this patent, as the invention of the said SYLLA and ADAMS, is—

1. The combination of a finger-beam with slotted guard-fingers, a reciprocating scalloped cutter, a double hinge connection between the finger-beam and the main frame, and a driving-shaft for the cutting apparatus parallel, or nearly so, to the ground.

2. The combination of a double hinge floating finger-beam with slotted guard-fingers, a reciprocating scalloped cutter, and a removable platform for converting the machine from a mower to a reaper.

3. The combination of a finger-beam with slotted fingers, a reciprocating scalloped cutter, a hinged connection to the main frame, a removable platform, and a reel.

4. The combination of a finger-beam with slotted fingers, a reciprocating scalloped cutter, a hinged connection to the main frame, and arms or levers, or their equivalents, for adjusting the height of the cutting apparatus.

PHILO SYLLA.
AUGUSTUS ADAMS.

Witnesses:
HENRY H. TAYLOR,
CHAS. F. WAGNER.